US012756175B2

(12) United States Patent
Telefus et al.

(10) Patent No.: US 12,756,175 B2
(45) Date of Patent: Oct. 6, 2026

(54) GROUND FAULT DETECTION IN AC SYSTEMS USING DIGITAL SIGNAL PROCESSING

(71) Applicant: Amber Semiconductor, Inc., Dublin, CA (US)

(72) Inventors: Mark Telefus, Orinda, CA (US); Harry Rodriguez, San Jose, CA (US); Suhail Zain, San Ramon, CA (US)

(73) Assignee: Amber Semiconductor, Inc., Dublin, CA (US)

( * ) Notice: Subject to any disclaimer, the term of this patent is extended or adjusted under 35 U.S.C. 154(b) by 363 days.

(21) Appl. No.: 18/523,333

(22) Filed: Nov. 29, 2023

(65) Prior Publication Data

US 2024/0178653 A1 May 30, 2024

Related U.S. Application Data

(60) Provisional application No. 63/428,465, filed on Nov. 29, 2022.

(51) Int. Cl.
*H02H 3/32* (2006.01)
*H02H 1/00* (2006.01)

(52) U.S. Cl.
CPC ............ *H02H 3/32* (2013.01); *H02H 1/0007* (2013.01)

(58) Field of Classification Search
CPC ........ H02H 3/32; H02H 1/0007; G01R 19/00; G01R 19/02; G01R 19/04; G01R 19/25;
(Continued)

(56) References Cited

U.S. PATENT DOCUMENTS 3,638,102 A 1/1972 Pelka
3,777,253 A 12/1973 Callan
(Continued)

FOREIGN PATENT DOCUMENTS

CN 109075551 B 1/2021
DE 19712261 A1 10/1998
(Continued)

OTHER PUBLICATIONS

K. Yang et al. "Series Arc Fault Detection Algorithm Based on Autoregressive Bispecturm Analysis," Algorithms, vol. 8, Oct. 16, 2015, pp. 929-950.
(Continued)

*Primary Examiner* — Monica Lewis
*Assistant Examiner* — Nicolas Bellido
(74) *Attorney, Agent, or Firm* — Ryan, Mason & Lewis, LLP

(57) ABSTRACT

A device comprises current sense circuitry, analog-to-digital converter circuitry, and digital signal processing circuitry. The current sense circuitry is configured to sense a first current flowing in a first wire and a second current flowing in a second wire, the first and second wires being configured to supply AC power to a load coupled to the device. The analog-to-digital converter circuitry is configured to generate first digital data corresponding to the first current, and second digital data corresponding to the second current. The digital signal processing circuitry is configured to process the first digital data and the second digital data to determine a difference between the first current and the second current, and to generate a control signal to interrupt current flow in the first and second wires, in response to determining that the difference between the first current and the second current meets or exceeds a difference threshold.

20 Claims, 3 Drawing Sheets

(58) Field of Classification Search
CPC . G01R 19/2506; G01R 19/2513; G01R 21/00
See application file for complete search history.

(56) References Cited

U.S. PATENT DOCUMENTS

| | | | |
|---|---|---|---|
| 4,074,345 | A | 2/1978 | Ackermann |
| 4,127,895 | A | 11/1978 | Krueger |
| 4,245,148 | A | 1/1981 | Gisske et al. |
| 4,245,184 | A | 1/1981 | Billings et al. |
| 4,245,185 | A | 1/1981 | Mitchell et al. |
| 4,257,081 | A | 3/1981 | Sauer et al. |
| 4,466,071 | A | 8/1984 | Russell, Jr. |
| 4,487,458 | A | 12/1984 | Janutka |
| 4,581,540 | A | 4/1986 | Guajardo |
| 4,631,625 | A | 12/1986 | Alexander et al. |
| 4,636,907 | A | 1/1987 | Howell |
| 4,641,233 | A | 2/1987 | Roy |
| 4,649,302 | A | 3/1987 | Damiano et al. |
| 4,653,084 | A | 3/1987 | Ahuja |
| 4,682,061 | A | 7/1987 | Donovan |
| 4,685,046 | A | 8/1987 | Sanders |
| 4,709,296 | A | 11/1987 | Hung et al. |
| 4,760,293 | A | 7/1988 | Hebenstreit |
| 4,766,281 | A | 8/1988 | Buhler |
| 4,806,844 | A | 2/1989 | Claydon et al. |
| 4,812,995 | A | 3/1989 | Girgis et al. |
| 4,888,504 | A | 12/1989 | Kinzer |
| 4,945,345 | A | 7/1990 | Proctor et al. |
| 5,041,960 | A | 8/1991 | Tseruel |
| 5,118,993 | A | 6/1992 | Yang |
| 5,121,282 | A | 6/1992 | White |
| 5,276,737 | A | 1/1994 | Micali |
| 5,307,257 | A | 4/1994 | Fukushima |
| 5,371,646 | A | 12/1994 | Biegelmeier |
| 5,410,745 | A | 4/1995 | Friesen et al. |
| 5,559,656 | A | 9/1996 | Chokhawala |
| 5,646,514 | A | 7/1997 | Tsunetsugu |
| 5,654,880 | A | 8/1997 | Brkovic et al. |
| 5,731,732 | A | 3/1998 | Williams |
| 5,793,596 | A | 8/1998 | Jordan et al. |
| 5,796,274 | A | 8/1998 | Willis et al. |
| 5,801,933 | A | 9/1998 | Ravid |
| 5,844,759 | A | 12/1998 | Hirsh et al. |
| 5,859,756 | A | 1/1999 | Pressman et al. |
| 5,870,009 | A | 2/1999 | Serpinet et al. |
| 5,933,305 | A | 8/1999 | Schmalz et al. |
| 6,081,123 | A | 6/2000 | Kasbarian et al. |
| 6,111,494 | A | 8/2000 | Fischer et al. |
| 6,111,733 | A | 8/2000 | Neiger et al. |
| 6,115,267 | A | 9/2000 | Herbert |
| 6,141,197 | A | 10/2000 | Kim et al. |
| 6,160,689 | A | 12/2000 | Stolzenberg |
| 6,167,329 | A | 12/2000 | Engel et al. |
| 6,169,391 | B1 | 1/2001 | Lei |
| 6,188,203 | B1 | 2/2001 | Rice et al. |
| 6,282,109 | B1 | 8/2001 | Fraidlin et al. |
| 6,300,748 | B1 | 10/2001 | Miller |
| 6,369,554 | B1 | 4/2002 | Aram |
| 6,437,955 | B1 | 8/2002 | Duffy et al. |
| 6,483,290 | B1 | 11/2002 | Hemminger et al. |
| 6,515,434 | B1 | 2/2003 | Biebl |
| 6,538,906 | B1 | 3/2003 | Ke et al. |
| 6,788,512 | B2 | 9/2004 | Vicente et al. |
| 6,807,035 | B1 | 10/2004 | Baldwin et al. |
| 6,813,720 | B2 | 11/2004 | Leblanc |
| 6,839,208 | B2 | 1/2005 | Macbeth et al. |
| 6,843,680 | B2 | 1/2005 | Gorman |
| 6,906,476 | B1 | 6/2005 | Beatenbough et al. |
| 6,984,988 | B2 | 1/2006 | Yamamoto |
| 7,045,723 | B1 | 5/2006 | Projkovski |
| 7,053,626 | B2 | 5/2006 | Monter et al. |
| 7,110,225 | B1 | 9/2006 | Hick |
| 7,136,265 | B2 | 11/2006 | Wong et al. |
| 7,164,238 | B2 | 1/2007 | Kazanov et al. |
| 7,292,419 | B1 | 11/2007 | Nemir |
| 7,297,603 | B2 | 11/2007 | Robb et al. |
| 7,304,828 | B1 | 12/2007 | Shvartsman |
| D558,683 | S | 1/2008 | Pape et al. |
| 7,319,574 | B2 | 1/2008 | Engel |
| D568,253 | S | 5/2008 | Gorman |
| 7,367,121 | B1 | 5/2008 | Gorman |
| 7,586,285 | B2 | 9/2009 | Gunji |
| 7,595,680 | B2 | 9/2009 | Morita et al. |
| 7,596,004 | B2 | 9/2009 | Grbovic |
| 7,633,727 | B2 | 12/2009 | Zhou et al. |
| 7,643,256 | B2 | 1/2010 | Wright et al. |
| 7,693,670 | B2 | 4/2010 | Durling et al. |
| 7,715,216 | B2 | 5/2010 | Liu et al. |
| 7,729,147 | B1 | 6/2010 | Wong et al. |
| 7,731,403 | B2 | 6/2010 | Lynam et al. |
| 7,746,677 | B2 | 6/2010 | Unkrich |
| 7,821,023 | B2 | 10/2010 | Yuan et al. |
| D638,355 | S | 5/2011 | Chen |
| 7,936,279 | B2 | 5/2011 | Tang et al. |
| 7,948,719 | B2 | 5/2011 | Xu |
| 8,124,888 | B2 | 2/2012 | Etemad-Moghadam et al. |
| 8,174,804 | B2 | 5/2012 | Fasano |
| 8,184,419 | B2 | 5/2012 | Peng |
| 8,256,675 | B2 | 9/2012 | Baglin et al. |
| 8,295,950 | B1 | 10/2012 | Wordsworth et al. |
| 8,374,729 | B2 | 2/2013 | Chapel et al. |
| 8,463,453 | B2 | 6/2013 | Parsons, Jr. |
| 8,482,885 | B2 | 7/2013 | Billingsley et al. |
| 8,560,134 | B1 | 10/2013 | Lee |
| 8,649,883 | B2 | 2/2014 | Lu et al. |
| 8,664,886 | B2 | 3/2014 | Ostrovsky |
| 8,717,720 | B2 | 5/2014 | DeBoer |
| 8,718,830 | B2 | 5/2014 | Smith |
| 8,737,030 | B2 | 5/2014 | Valdes |
| 8,781,637 | B2 | 7/2014 | Eaves |
| 8,817,441 | B2 | 8/2014 | Callanan |
| 8,890,371 | B2 | 11/2014 | Gotou |
| D720,295 | S | 12/2014 | Dodal et al. |
| 8,947,838 | B2 | 2/2015 | Yamai et al. |
| 9,054,587 | B2 | 6/2015 | Neyman |
| 9,055,641 | B2 | 6/2015 | Shteynberg et al. |
| 9,237,617 | B1 | 1/2016 | Xiong |
| 9,287,792 | B2 | 3/2016 | Telefus et al. |
| 9,325,516 | B2 | 4/2016 | Pera et al. |
| 9,366,702 | B2 | 6/2016 | Steele et al. |
| 9,439,318 | B2 | 9/2016 | Chen |
| 9,443,845 | B1 | 9/2016 | Stafanov et al. |
| 9,502,832 | B1 | 11/2016 | Ullahkhan et al. |
| 9,509,083 | B2 | 11/2016 | Yang |
| 9,515,560 | B1 | 12/2016 | Telefus et al. |
| 9,577,420 | B2 | 2/2017 | Ostrovsky et al. |
| 9,608,430 | B2 | 3/2017 | Duan et al. |
| 9,621,053 | B1 | 4/2017 | Telefus |
| 9,755,630 | B2 | 9/2017 | Urciuoli |
| 9,759,758 | B2 | 9/2017 | Ostrovsky et al. |
| 9,774,182 | B2 | 9/2017 | Phillips |
| 9,836,243 | B1 | 12/2017 | Chanler et al. |
| 9,883,554 | B2 | 1/2018 | Lynch |
| D814,424 | S | 4/2018 | DeCosta |
| 9,965,007 | B2 | 5/2018 | Amelio et al. |
| 9,978,553 | B2 | 5/2018 | Tomimbang et al. |
| 9,991,633 | B2 | 6/2018 | Robinet |
| 10,072,942 | B2 | 9/2018 | Wootton et al. |
| 10,076,006 | B2 | 9/2018 | Kahlman et al. |
| 10,101,716 | B2 | 10/2018 | Kim |
| 10,135,235 | B2 | 11/2018 | Cui et al. |
| 10,187,944 | B2 | 1/2019 | MacAdam et al. |
| 10,243,350 | B2 | 3/2019 | Pan et al. |
| 10,469,077 | B2 | 11/2019 | Telefus et al. |
| 10,548,188 | B2 | 1/2020 | Cheng et al. |
| D879,056 | S | 3/2020 | Telefus |
| D881,144 | S | 4/2020 | Telefus |
| 10,615,713 | B2 | 4/2020 | Telefus et al. |
| 10,756,662 | B2 | 8/2020 | Steiner et al. |
| 10,812,072 | B2 | 10/2020 | Telefus et al. |
| 10,812,282 | B2 | 10/2020 | Telefus et al. |
| 10,819,336 | B2 | 10/2020 | Telefus et al. |
| 10,834,792 | B2 | 11/2020 | Telefus et al. |
| 10,931,473 | B2 | 2/2021 | Telefus et al. |

(56) References Cited

U.S. PATENT DOCUMENTS 10,985,548 B2 4/2021 Telefus
10,992,236 B2 4/2021 Telefus et al.
11,050,236 B2 6/2021 Telefus et al.
11,056,981 B2 7/2021 Telefus
11,064,586 B2 7/2021 Telefus et al.
11,114,947 B2 9/2021 Telefus et al.
11,170,964 B2 11/2021 Telefus et al.
11,201,460 B2 12/2021 Oishi et al.
11,245,339 B2 2/2022 Telefus et al.
11,336,199 B2 5/2022 Telefus et al.
11,342,151 B2 5/2022 Telefus et al.
11,342,735 B2 5/2022 Telefus et al.
11,348,752 B2 5/2022 Telefus et al.
11,349,296 B2 5/2022 Telefus
11,349,297 B2 * 5/2022 Telefus ................ H02H 1/0015
11,363,690 B2 6/2022 Telefus et al.
11,373,831 B2 6/2022 Telefus et al.
11,422,520 B2 8/2022 Telefus et al.
11,551,899 B2 1/2023 Telefus et al.
11,581,725 B2 2/2023 Telefus
11,670,946 B2 6/2023 Telefus et al.
11,671,029 B2 6/2023 Telefus
11,682,891 B2 6/2023 Telefus et al.
11,721,508 B2 8/2023 Telefus et al.
11,764,565 B2 9/2023 Telefus
11,791,616 B2 10/2023 Telefus
2002/0109487 A1 8/2002 Telefus et al.
2003/0052544 A1 3/2003 Yamamoto et al.
2003/0063420 A1 4/2003 Pahl et al.
2003/0125885 A1 7/2003 Dougherty et al.
2003/0151865 A1 8/2003 Maio
2004/0032756 A1 2/2004 Van Den Bossche
2004/0251884 A1 12/2004 Steffie et al.
2005/0128657 A1 6/2005 Covault
2005/0162139 A1 7/2005 Hirst
2005/0185353 A1 8/2005 Rasmussen et al.
2005/0286184 A1 12/2005 Campolo
2006/0227469 A1 10/2006 Parker et al.
2006/0285366 A1 12/2006 Radecker et al.
2007/0008747 A1 1/2007 Soldano et al.
2007/0018506 A1 1/2007 Paik et al.
2007/0159745 A1 7/2007 Berberich et al.
2007/0188025 A1 8/2007 Keagy et al.
2007/0217237 A1 9/2007 Palestrina
2007/0236152 A1 10/2007 Davis et al.
2008/0006607 A1 1/2008 Boeder et al.
2008/0084201 A1 * 4/2008 Kojori ................ G01R 19/0015
324/117 R
2008/0136581 A1 6/2008 Heilman et al.
2008/0151444 A1 6/2008 Upton
2008/0174922 A1 7/2008 Kimbrough
2008/0180866 A1 7/2008 Wong
2008/0197699 A1 8/2008 Yu et al.
2008/0204950 A1 8/2008 Zhou et al.
2008/0234879 A1 9/2008 Fuller et al.
2008/0246451 A1 10/2008 Dobbins et al.
2008/0253153 A1 10/2008 Wu et al.
2009/0034139 A1 2/2009 Martin
2009/0067201 A1 3/2009 Cai
2009/0168273 A1 7/2009 Yu et al.
2009/0213629 A1 8/2009 Liu et al.
2009/0284385 A1 11/2009 Tang et al.
2010/0091418 A1 4/2010 Xu
2010/0156369 A1 6/2010 Kularatna et al.
2010/0188054 A1 7/2010 Asakura et al.
2010/0191487 A1 7/2010 Rada et al.
2010/0231135 A1 9/2010 Hum et al.
2010/0231373 A1 9/2010 Romp
2010/0244730 A1 9/2010 Nerone
2010/0261373 A1 10/2010 Roneker
2010/0284207 A1 11/2010 Watanabe et al.
2010/0296207 A1 11/2010 Schumacher et al.
2010/0320840 A1 12/2010 Fridberg
2011/0062936 A1 3/2011 Bartelous
2011/0121752 A1 5/2011 Newman, Jr. et al.
2011/0127922 A1 6/2011 Sauerlaender
2011/0156610 A1 6/2011 Ostrovsky et al.
2011/0227615 A1 9/2011 Faison
2011/0273103 A1 11/2011 Hong
2011/0292703 A1 12/2011 Cuk
2011/0301894 A1 12/2011 Sanderford, Jr.
2011/0305054 A1 12/2011 Yamagiwa et al.
2011/0307447 A1 12/2011 Sabaa et al.
2012/0026632 A1 2/2012 Acharya et al.
2012/0075897 A1 3/2012 Fujita
2012/0080942 A1 4/2012 Carralero et al.
2012/0089266 A1 4/2012 Tomimbang et al.
2012/0089366 A1 4/2012 Huyse
2012/0092797 A1 4/2012 Reeder et al.
2012/0095605 A1 4/2012 Tran
2012/0120700 A1 5/2012 Elberbaum
2012/0133289 A1 5/2012 Hum et al.
2012/0275076 A1 11/2012 Shono
2012/0323510 A1 12/2012 Bell et al.
2013/0026925 A1 1/2013 Ven et al.
2013/0033246 A1 2/2013 Krenz et al.
2013/0051102 A1 2/2013 Huang et al.
2013/0057247 A1 3/2013 Russell et al.
2013/0063851 A1 3/2013 Stevens et al.
2013/0066478 A1 3/2013 Smith
2013/0088160 A1 4/2013 Chai et al.
2013/0119958 A1 5/2013 Gasperi
2013/0128396 A1 5/2013 Danesh et al.
2013/0170261 A1 7/2013 Lee et al.
2013/0176758 A1 7/2013 Tseng et al.
2013/0187631 A1 7/2013 Russell et al.
2013/0253898 A1 9/2013 Meagher et al.
2013/0261821 A1 10/2013 Lu et al.
2013/0265041 A1 10/2013 Friedrich et al.
2013/0329331 A1 12/2013 Erger et al.
2014/0043732 A1 2/2014 McKay et al.
2014/0067137 A1 3/2014 Amelio et al.
2014/0085940 A1 3/2014 Lee et al.
2014/0097809 A1 4/2014 Follic et al.
2014/0159593 A1 6/2014 Chu et al.
2014/0164294 A1 6/2014 Osann, Jr.
2014/0203718 A1 7/2014 Yoon et al.
2014/0268935 A1 9/2014 Chiang
2014/0268956 A1 9/2014 Teren et al.
2014/0276753 A1 9/2014 Wham et al.
2014/0365490 A1 12/2014 Yang et al.
2015/0042274 A1 2/2015 Kim et al.
2015/0055261 A1 2/2015 Lubicki et al.
2015/0097430 A1 4/2015 Scruggs
2015/0116886 A1 4/2015 Zehnder et al.
2015/0155789 A1 6/2015 Freeman et al.
2015/0180469 A1 6/2015 Kim
2015/0185262 A1 7/2015 Song et al.
2015/0216006 A1 7/2015 Lee et al.
2015/0236587 A1 8/2015 Kim et al.
2015/0256355 A1 9/2015 Pera et al.
2015/0256665 A1 9/2015 Pera et al.
2015/0317326 A1 11/2015 Bandarupalli et al.
2016/0057841 A1 2/2016 Lenig
2016/0069933 A1 3/2016 Cook et al.
2016/0077746 A1 3/2016 Muth et al.
2016/0081143 A1 3/2016 Wang
2016/0126031 A1 5/2016 Wootton et al.
2016/0178691 A1 6/2016 Simonin
2016/0181941 A1 6/2016 Gratton et al.
2016/0195864 A1 7/2016 Kim
2016/0247799 A1 8/2016 Stafanov et al.
2016/0294179 A1 10/2016 Kennedy et al.
2016/0360586 A1 12/2016 Yang et al.
2016/0381754 A1 12/2016 Chou et al.
2017/0004948 A1 1/2017 Leyh
2017/0019969 A1 1/2017 O'Neil et al.
2017/0063070 A1 * 3/2017 Miller .................. H01H 71/123
2017/0063225 A1 3/2017 Guo et al.
2017/0067961 A1 3/2017 O'Flynn
2017/0086281 A1 3/2017 Avrahamy
2017/0104325 A1 4/2017 Eriksen et al.
2017/0105265 A1 4/2017 Sadwick
2017/0168516 A1 6/2017 King

(56) References Cited

U.S. PATENT DOCUMENTS

| | | | |
|---|---|---|---|
| 2017/0170730 | A1 | 6/2017 | Sugiura |
| 2017/0179946 | A1 | 6/2017 | Turvey |
| 2017/0214967 | A1 | 7/2017 | Xia et al. |
| 2017/0244241 | A1 | 8/2017 | Wilson et al. |
| 2017/0256934 | A1 | 9/2017 | Kennedy et al. |
| 2017/0256956 | A1 | 9/2017 | Irish et al. |
| 2017/0265287 | A1 | 9/2017 | Avrahamy |
| 2017/0277709 | A1 | 9/2017 | Strauss et al. |
| 2017/0314743 | A1 | 11/2017 | Del Castillo et al. |
| 2017/0322049 | A1 | 11/2017 | Wootton et al. |
| 2017/0322258 | A1 | 11/2017 | Miller et al. |
| 2017/0338809 | A1 | 11/2017 | Stefanov et al. |
| 2017/0347415 | A1 | 11/2017 | Cho et al. |
| 2018/0026534 | A1 | 1/2018 | Turcan |
| 2018/0054862 | A1 | 2/2018 | Takagimoto et al. |
| 2018/0059175 | A1 | 3/2018 | Hase |
| 2018/0130618 | A1 | 5/2018 | Ramirez |
| 2018/0188706 | A1 | 7/2018 | Wootton et al. |
| 2018/0201302 | A1 | 7/2018 | Sonoda et al. |
| 2018/0285198 | A1 | 10/2018 | Dantkale et al. |
| 2018/0307609 | A1 | 10/2018 | Qiang et al. |
| 2018/0316179 | A1 | 11/2018 | Ofek |
| 2018/0323723 | A1 | 11/2018 | Mochizuki |
| 2018/0351342 | A1 | 12/2018 | Anderson et al. |
| 2019/0003855 | A1 | 1/2019 | Wootton et al. |
| 2019/0052174 | A1 | 2/2019 | Gong |
| 2019/0122834 | A1 | 4/2019 | Wootton et al. |
| 2019/0140640 | A1 | 5/2019 | Telefus et al. |
| 2019/0148931 | A1 | 5/2019 | Li |
| 2019/0165691 | A1 | 5/2019 | Telefus et al. |
| 2019/0181679 | A1 | 6/2019 | Northway et al. |
| 2019/0207375 | A1 | 7/2019 | Telefus et al. |
| 2019/0222058 | A1 | 7/2019 | Sharifipour |
| 2019/0238060 | A1 | 8/2019 | Telefus et al. |
| 2019/0245457 | A1 | 8/2019 | Telefus et al. |
| 2019/0280887 | A1 | 9/2019 | Telefus et al. |
| 2019/0372331 | A1 | 12/2019 | Liu et al. |
| 2020/0007126 | A1 | 1/2020 | Telefus et al. |
| 2020/0014301 | A1 | 1/2020 | Telefus |
| 2020/0014379 | A1 | 1/2020 | Telefus |
| 2020/0044883 | A1 | 2/2020 | Telefus et al. |
| 2020/0052607 | A1 | 2/2020 | Telefus et al. |
| 2020/0106259 | A1 | 4/2020 | Telefus |
| 2020/0106260 | A1 | 4/2020 | Telefus |
| 2020/0196412 | A1 | 6/2020 | Telefus et al. |
| 2020/0287537 | A1 | 9/2020 | Telefus et al. |
| 2020/0365356 | A1 | 11/2020 | Telefus et al. |
| 2020/0366078 | A1 | 11/2020 | Telefus et al. |
| 2020/0366079 | A1 | 11/2020 | Telefus et al. |
| 2021/0014947 | A1 | 1/2021 | Telefus et al. |
| 2021/0119528 | A1 | 4/2021 | Telefus |
| 2021/0173364 | A1 | 6/2021 | Telefus et al. |
| 2021/0226441 | A1 | 7/2021 | Telefus et al. |
| 2021/0234356 | A1 | 7/2021 | Telefus et al. |
| 2021/0336555 | A1 | 10/2021 | Telefus |
| 2021/0345462 | A1 | 11/2021 | Telefus et al. |
| 2022/0052533 | A1 | 2/2022 | Telefus et al. |
| 2022/0189721 | A1 | 6/2022 | Telefus et al. |
| 2022/0255310 | A1 | 8/2022 | Telefus |
| 2022/0311350 | A1 | 9/2022 | Telefus |
| 2022/0399174 | A1 | 12/2022 | Telefus et al. |
| 2022/0416681 | A1 | 12/2022 | Telefus |
| 2023/0067227 | A1 | 3/2023 | Telefus |
| 2023/0121575 | A1 | 4/2023 | Baker |
| 2023/0127078 | A1 | 4/2023 | Telefus et al. |
| 2023/0162937 | A1 | 5/2023 | Telefus et al. |
| 2023/0253799 | A1 | 8/2023 | Telefus et al. |
| 2023/0261560 | A1 | 8/2023 | Baker et al. |

FOREIGN PATENT DOCUMENTS

| | | | | | |
|---|---|---|---|---|---|
| EP | 0016646 | A1 | | 10/1980 | |
| EP | 0398026 | A2 | | 11/1990 | |
| EP | 2560063 | A1 | | 2/2013 | |
| EP | 3736578 | B1 | * | 3/2025 | ............ G01R 23/02 |
| GB | 1302357 | A | | 1/1973 | |
| GB | 2458699 | A | | 9/2009 | |
| JP | 06053779 | A | * | 2/1994 | |
| JP | 2001196908 | A | | 7/2001 | |
| JP | 2012244716 | A | | 12/2012 | |
| JP | 2013230034 | A | * | 11/2013 | |
| JP | 2014030355 | A | * | 2/2014 | |
| JP | 6997105 | B2 | | 1/2022 | |
| WO | 2010110951 | A1 | | 9/2010 | |
| WO | 2016105505 | A1 | | 6/2016 | |
| WO | 2016110833 | A2 | | 7/2016 | |
| WO | 2017196571 | A1 | | 11/2017 | |
| WO | 2017196572 | A1 | | 11/2017 | |
| WO | 2017196649 | A1 | | 11/2017 | |
| WO | 2018075726 | A1 | | 4/2018 | |
| WO | 2018080604 | A1 | | 5/2018 | |
| WO | 2018080614 | A1 | | 5/2018 | |
| WO | 2018081619 | A2 | | 5/2018 | |
| WO | 2018081619 | A3 | | 5/2018 | |
| WO | 2018159914 | A1 | | 9/2018 | |
| WO | 2019133110 | A1 | | 7/2019 | |
| WO | 2020014158 | A1 | | 1/2020 | |
| WO | 2020014161 | A1 | | 1/2020 | |
| WO | PCT/US19/54102 | | | 2/2020 | |
| WO | 2020072516 | A1 | | 4/2020 | |
| WO | PCT/US19/67004 | | | 4/2020 | |
| WO | 2020131977 | A1 | | 6/2020 | |
| WO | PCT/US20/33421 | | | 9/2020 | |
| WO | 2020236726 | A1 | | 11/2020 | |
| WO | PCT/US21/14320 | | | 4/2021 | |
| WO | WO-2021112870 | A1 | * | 6/2021 | ........... H01H 71/125 |
| WO | 2021150684 | A1 | | 7/2021 | |
| WO | 2021183172 | A1 | | 9/2021 | |
| WO | PCT/US21/45624 | | | 11/2021 | |
| WO | 2022031276 | A1 | | 2/2022 | |
| WO | 2022036016 | A1 | | 2/2022 | |

OTHER PUBLICATIONS

J.-E. Park et al., “Design on Topologies for High Efficiency Two-Stage AC-DC Converter,” 2012 IEEE 7th International Power Electronics and Motion Control Conference—ECCE Asia, Jun. 2-5, 2012, China, 6 pages.

S. Cuk, “98% Efficient Single-Stage AC/DC Converter Topologies,” Power Electronics Europe, Issue 4, 2011, 6 pages.

E. Carvou et al., “Electrical Arc Characterization for Ac-Arc Fault Applications,” 2009 Proceedings of the 55th IEEE Holm Conference on Electrical Contacts, IEEE Explore Oct. 9, 2009, 6 pages.

C. Restrepo, “Arc Fault Detection and Discrimination Methods,” 2007 Proceedings of the 53rd IEEE Holm Conference on Electrical Contacts, IEEE Explore Sep. 24, 2007, 8 pages.

K. Eguchi et al., “Design of a Charge-Pump Type AC-DC Converter for RF-ID Tags,” 2006 International Symposium on Communications and Information Technologies, F4D-3, IEEE, 2006, 4 pages.

A. Ayari et al., “Active Power Measurement Comparison Between Analog and Digital Methods,” International Conference on Electrical Engineering and Software Applications, 2013, 6 pages.

G. D. Gregory et al., “The Arc-Fault Circuit Interrupter, an Emerging Product,” IEEE, 1998, 8 pages.

D. Irwin et al., “Exploiting Home Automation Protocols for Load Monitoring in Smart Buildings,” BuildSys ’11: Proceedings of the Third ACM Workshop on Embedded Sensing Systems for Energy-Efficiency in Buildings, Nov. 2011, 6 pages.

B. Mrazovac et al., “Towards Ubiquitous Smart Outlets for Safety and Energetic Efficiency of Home Electric Appliances,” 2011 IEEE International Conference on Consumer Electronics, Berlin, German, Sep. 6-8, 2011, 5 pages.

L. Shengyuan et al., “Instantaneous Value Sampling AC-DC Converter and its Application in Power Quantity Detection,” 2011 Third International Conference on Measuring Technology and Mechatronics Automation, Jan. 6-7, 2011, 4 pages.

H.-H. Chang et al., “Load Recognition for Different Loads with the Same Real Power and Reactive Power in a Non-intrusive Load-monitoring System,” 2008 12th International Conference on Computer Supported Cooperative Work in Design, Apr. 16-18, 2008, 6 pages.

(56) References Cited

OTHER PUBLICATIONS

Darmayuda et al., "Ultra Fast Solid State Ground Fault Isolator," International Journal of Electronics and Communication Engineering, vol. 6, No. 9, Oct. 2012, pp. 902-905.
U.S. Appl. No. 63/356,317 filed in the name of Mark Telefus et al., filed Jun. 28, 2022, and entitled "FET-Based AC-to-DC Converter with Negative Cycle Gate Pre-Charge."
U.S. Appl. No. 63/402,058 filed in the name of Mark Telefus et al., filed Aug. 29, 2022, and entitled "Thermal-Mechanical Framework For Solid-State Circuit Breaker."
U.S. Appl. No. 63/436,344 filed in the name of Mark Telefus, filed Dec. 30, 2022, and entitled "Bidirectional Switch Device Implemented Using Bridge Rectifier."
U.S. Appl. No. 63/462,376 filed in the name of Mark Telefus, filed Apr. 27, 2023, and entitled "AC-to-DC Converter with Intelligent Capacitive Energy Storage Regulator."

* cited by examiner

300

GROUND FAULT DETECTION IN AC SYSTEMS USING DIGITAL SIGNAL PROCESSING

CROSS-REFERENCE TO RELATED APPLICATION

This application claims priority to U.S. Provisional Application Ser. No. 63/428,465, filed on Nov. 29, 2022, the disclosure of which is fully incorporated herein by reference.

TECHNICAL FIELD

This disclosure relates to devices and methods for monitoring and detecting ground faults, and protecting against ground fault conditions.

BACKGROUND

A ground fault is an unintentional electrical path between a power source (e.g., hot line or neural line of AC system) and earth ground or chassis ground. A ground fault circuit interrupter (GFCI) device (e.g., GFCI circuit breaker, GFCI outlet, etc.) is a device that is configured to monitor current on a hot line (hot line current) and return current on a neutral line (neutral line current) to determine if there is a difference (differential current) between hot and neutral line currents. In the event that a differential current is detected within a certain threshold (e.g., 5 milliamps), the GFCI device will interrupt power delivered to a device or load connected to the GFCI device. The occurrence of the differential current means some leakage current is flowing through some undesired path to ground. The GFCI device will cut-off the power to protect against the ground fault. Typically, a GFCI device is designed to quickly interrupt power (e.g., at a speed between 25-40 milliseconds) after detecting a ground fault.

Conventional GFCI devices implement current sensing transformers (e.g., toroidal sensors) which are configured to compare the amount of hot line current and the amount of neutral line current flowing to and from a load connected to the GFCI device. There are various drawbacks to conventional GFCI devices. For example, the current sensing toroidal components that are typically utilized to monitor the hot and neutral currents are bulky components which occupy a relatively large amount of space within a housing of the GFCI device. In addition, conventional GFCI devices are prone to nuisance tripping. For example, a GFCI device can trip as a result of the accumulated leakage current of multiple devices connected to the load side of the GFCI device, or when a given electrical appliance is leaking too much current to ground for a particular reason. In addition, nuisance tripping of a GFCI device can occur in areas with a relatively high level of moisture or condensation. Other causes of nuisance tripping include, but are not limited to, a defective GFCI device, improper wiring of the GFCI device, faulty wiring, etc. In such instances, the only thing a person can do is reset the GFCI device (e.g., pressing a reset button on a GFCI outlet), and hope the fault goes away. The GFCI device provides no indication as to why the tripping occurred.

SUMMARY

Exemplary embodiments of the disclosure include devices and methods for detecting and protecting against ground fault conditions.

An exemplary embodiment includes a device which comprises current sense circuitry, analog-to-digital converter circuitry, and digital signal processing circuitry. The current sense circuitry is configured to sense a first current flowing in a first wire and to sense a second current flowing in a second wire, the first and second wires being configured to supply AC power to a load coupled to the device. The analog-to-digital converter circuitry is configured to generate first digital data corresponding to the first current, and to generate second digital data corresponding to the second current. The digital signal processing circuitry is configured to (i) process the first digital data and the second digital data to determine a difference between the first current and the second current, and (ii) generate a control signal to interrupt current flow in the first and second wires, in response to determining that the difference between the first current and the second current meets or exceeds a difference threshold.

Another exemplary embodiment includes a device which comprises: a first electrical path and a second electrical path configured to supply alternative current (AC) power to a load coupled to the device; a first current sense resistor configured to generate a first sense voltage corresponding to a first current flowing in the first electrical path; a second current sense resistor configured to generate a second sense voltage corresponding to a second current flowing in the second electrical path; a first analog-to-digital converter circuit configured to convert the first sense voltage to a first digital voltage; a second analog-to-digital converter circuit configured to convert the second sense voltage to a second digital voltage; and control circuitry configured to (i) process the first digital voltage and the second digital voltage to determine a difference between the first current and the second current, and (ii) generate a control signal to interrupt current flow in the first and second electrical paths, in response to determining that the difference between the first current and the second current meets or exceeds a difference threshold.

In another exemplary embodiment, which may be combined with one or more of the embodiments of the preceding paragraphs, the device comprises a ground fault circuit interrupter outlet device.

In another exemplary embodiment, which may be combined with one or more of the embodiments of the preceding paragraphs, the device comprises a ground fault circuit interrupter circuit breaker device.

Another exemplary embodiment includes a method which comprises: sensing a first current flowing in a first wire and a second current flowing in a second wire, the first and second wires being configured to supply alternative current (AC) power to a load; generating first digital data corresponding to the first current, and second digital data corresponding to the second current; and processing the first digital data and the second digital data to determine a difference between the first current and the second current, and generate a control signal to interrupt current flow in the first and second wires, in response to determining that the difference between the first current and the second current meets or exceeds a difference threshold.

Other embodiments will be described in the following detailed description of exemplary embodiments, which is to be read in conjunction with the accompanying figures.

DETAILED DESCRIPTION

Embodiments of the disclosure will now be described in further detail with regard to devices and methods for detecting ground fault conditions, and protecting against ground fault conditions. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., application specific integrated circuit (ASIC) devices, field programmable gate array (FPGA) devices, etc.), processing devices (e.g., central processing unit (CPU) devices, graphical processing unit (GPU) devices, microcontroller devices, etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
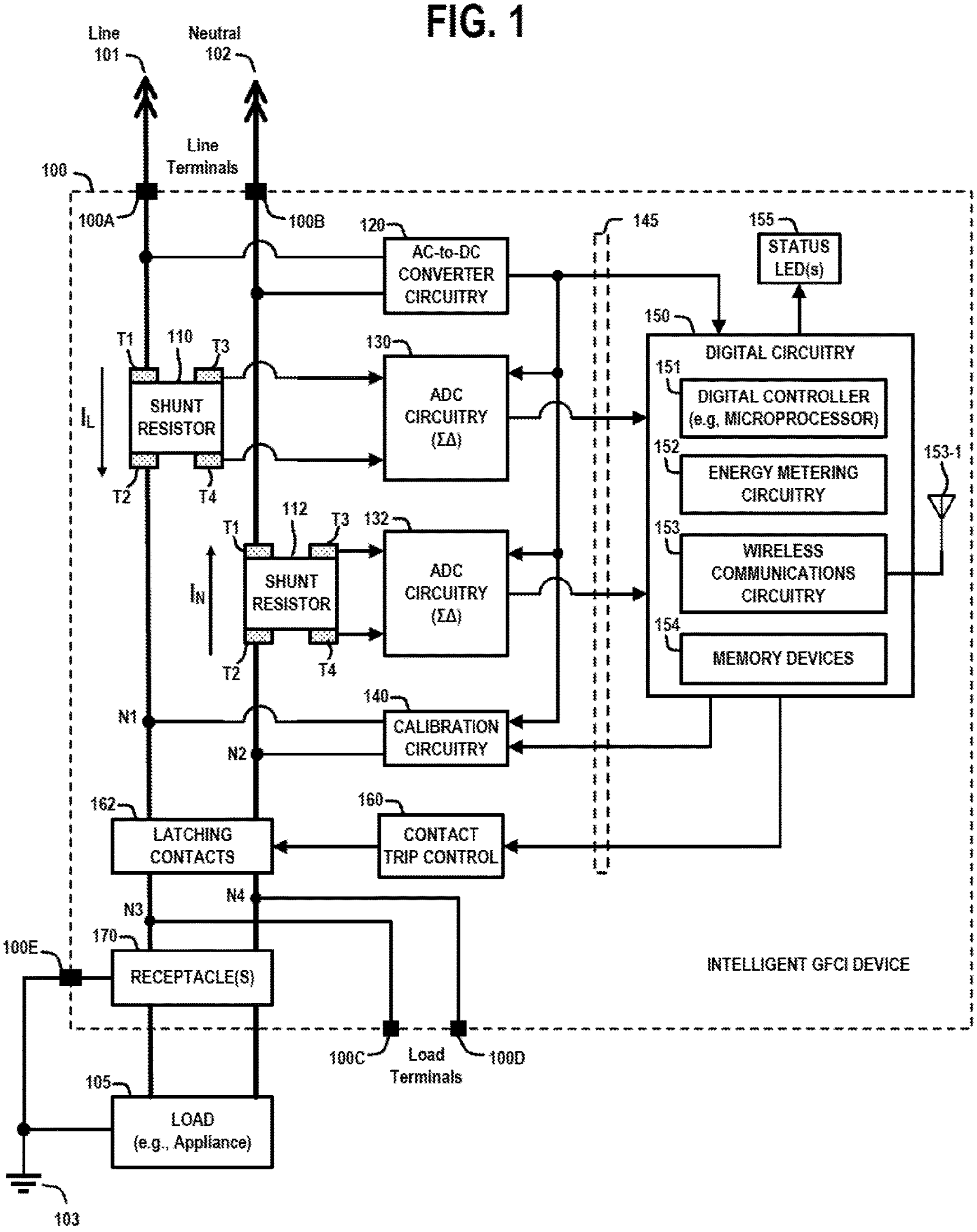
FIG. 1 schematically illustrates a device for detecting and protecting against ground fault conditions, according to an exemplary embodiment of the disclosure.

FIG. 1 schematically illustrates a device for detecting and protecting against ground fault conditions, according to an exemplary embodiment of the disclosure. In particular, FIG. 1 schematically illustrates a GFCI device 100 (e.g., GFCI outlet) which comprises first and second power input terminals 100A and 100B, first and second load terminals 100C and 100D, and a ground terminal 100E. The first and second power input terminals 100A and 100B are utilized to connect the GFCI device 100 to a hot line 101 (ungrounded power supply line (or Line)) and a neutral line 102 (grounded power supply line (or Neutral). The first and second load terminals 100C and 100D are utilized to connect the GFCI device 100 to one or more downstream devices (e.g., electrical outlets) that are connected on a same branch circuit, and allow the GFCI device 100 to provide GFCI protection to the one or more downstream devices on the same branch circuit. The ground terminal 100E is utilized to connect the GFCI device 100 to earth ground 103 (or equipment ground 103). The hot line 101 and the neutral line 102 supply AC power (e.g., 120 V RMS, 60 Hz) to a load 105 (e.g., appliance) that is connected to the GFCI device 100 (e.g., electrical device or appliance plugged into a receptable 170 of the GFCI device 100).

As further schematically shown in FIG. 1, the GFCI device 100 comprises a first shunt resistor 110 (more generally, a first current sensor device), a second shunt resistor 112 (more generally, second current sensor device), a power converter circuit 120 (e.g., AC-to-DC converter circuitry 120), a first analog-to-digital (ADC) circuit 130, a second ADC circuit 132, a calibration circuit 140, isolation circuitry 145, digital circuitry 150, one or more status light-emitting diodes (LEDs) 155, a contact trip control element 160, latching contacts 162, and one or more receptacles 170 (or outlets). The latching contacts 162 are configured to connect/disconnect nodes N1 and N2 to/from nodes N3 and N4, respectively. The nodes N3 and N4 comprise first and second load output nodes. The isolation circuitry 145 is configured to isolate the digital and analog power domains of the analog and digital circuitry of the GFCI device 100. Although the isolation circuitry 145 is generically illustrated in FIG. 1, it is to be understood that the isolation circuitry 145 can be implemented using any suitable isolation circuitry and isolation techniques. For example, in some embodiments, the isolation circuitry 145 can be implemented using photovoltaic isolation circuits and techniques to provide the required isolation between the digital and analog power domains.

The digital circuitry 150 comprises various circuit components that are configured to control various functions and operations of the GFCI device 100 such as sensing operations, data processing and management operations, wired/wireless communications, and other intelligent functions, etc. In some embodiments, the digital circuitry 150 comprises a digital controller 151, energy metering/monitoring circuitry 152, wireless communications circuitry 153 and an associated antenna 153-1, and memory devices 154. The digital controller 151 is configured to implement GFCI control functions as described herein. In some embodiments, the digital controller 151 comprises a microprocessor, a microcontroller, an application-specific integrated circuit (ASIC), a field-programmable gate array (FPGA), or another type of programmable device, which is configured to execute algorithms to perform control functions as described herein.

In some embodiments, the energy metering/monitoring circuitry 152 is configured to measure power and energy usage of loads that are protected by the GFCI device 100. For example, in some embodiments, the energy metering/monitoring circuitry 152 is configured to process instantaneous voltage and current waveforms to compute RMS values of voltage and currents, active, reactive and apparent power and energies. In some embodiments, the energy metering/monitoring circuitry 152 comprises a microprocessor, an ASIC, or an application-specific standard product (ASSP) chip that implements the desired energy metering functionalities.

The wireless communications circuitry 153 is configured to enable communication between the GFCI device 100 and one or more remote computing devices and systems (e.g., computer or smart electrical device). In some embodiments, the wireless communications circuitry 153 comprises transmitter circuitry. In other embodiments, the wireless communications circuitry 153 comprises transmitter and receiver circuitry (e.g., transceiver circuitry). The wireless communications circuitry 153 can implement proprietary or standard wireless communication protocols. For example, the wireless communications circuitry 153 can implement a standard wireless communication protocol such as Wi-Fi®, near-field communication (NFC), Bluetooth®, Bluetooth Low Energy (BLE), or ZigBee®, and other types of standards-based wireless mesh networks. In some embodiments, the wireless communication and networking functions of the GFCI device 100 are configured to enable ad-hoc network communication between network adjacent smart electrical devices, and communicating with other network nodes which operate as edge computing nodes to collect and process data to implement one or more applications.

In some embodiments, the antenna 153-1 comprises one or more printed/planar antenna elements (radiators) and transmission lines which are configured to receive wireless radio signals that are input to and processed by the wireless communications circuitry 153, and to transmit wireless radio signals generated by wireless communications circuitry 153 to wirelessly transmit information (e.g., operating status of the GFCI device 100, reporting fault conditions, etc.) to a remote node. The antenna 153-1 is configured to capture and transmit wireless signals at the operating frequency or frequencies of the wireless communications circuitry 153 (e.g., 2.4 GHz or 5 GHz Industrial, Scientific and Medical (ISM) bands, etc.)

Furthermore, in some embodiments, the memory devices 154 comprise volatile memory (e.g., RAM) and non-volatile memory such as a flash memory device, a solid-state drive (SSD) device, or other types and combinations of non-volatile memory devices, which are suitable for the given application. The memory devices 154 are utilized for various purposes including, but not limited to, (i) storing program code and configuration data, etc., which is utilized by the various system components 151, 152, and 153 to perform respective functions (e.g., control and manage the sensing, data processing, and communication operations, etc.), (ii) persistently storing an operating state of the GFCI device 100, (iii) storing digital data generated by the first and second ADC circuits 130 and 132, (iv) storing data processing results generated by the digital controller 151, (v) storing power usage information generated by the energy metering/monitoring circuitry 152, and (vi) otherwise providing local persistent storage for other purposes, as needed.

The status LEDs 155 include one or more LED devices that are configured to illuminate in response to control signals received from the digital circuitry 150 to indicate an operating status of the GFCI device 100. The status LEDs 155 can generate and emit, or otherwise have different colors (e.g., red, green, yellow, blue, etc.) and/or have different illumination patterns (e.g., continuous, blinking, etc.) which represent different operational states of the GFCI device 100. For example, in some embodiments, the status LEDs 155 can have an LED that emits a certain color (e.g., continuous green color) which indicates that the GFCI device 100 has power and is correctly operating in a normal state. Moreover, in some embodiments, the status LEDs 155 can have an LED that emits a certain color (e.g., red) to visually display an alarm condition, e.g., that the GFCI device 100 has tripped as a result of a ground fault, overloading, short circuit, and the like, or the GFCI device 100 has carried out a self-test and failed. Further, in some embodiments, the status LEDs 155 can have an LED that emits a certain color (e.g., blue) that indicates a status of network connection, wherein a solid blue LED indicates that the GFCI device 100 is connected to a given network, and a blinking blue LED indicates that the GFCI device 100 is not connected to the network or is in the process of connecting to the network.

In some embodiments, the power converter circuit 120 is configured to convert AC power, which is supplied on the hot and neutral lines 101 and 102, into DC power. In particular, in some embodiments, the power converter circuit 120 generates one or more DC operating voltages, as needed, to provide DC supply power the various components (e.g., first and second ADC circuits 130 and 132, the calibration circuitry 140, the digital circuitry 150, etc.) of the GFCI device 100. The power converter circuit 120 can be implemented using suitable AC-to-DC conversion techniques.

The first shunt resistor 110 comprises a current sensor resistor that is configured to sense a magnitude of a line current (denoted $I_L$) which flows in a hot electrical path between the hot line 101 (first power input terminal 100A) and the output node N3. Similarly, the second shunt resistor 112 comprises a current sensor resistor that is configured to sense a magnitude of a neutral current (denoted $I_N$) which flows in a neutral electrical path between the neutral line 102 (second power input terminal 100B) and the output node N4. In operation, the first shunt resistor 110 generates a first analog sense voltage which is proportional to the magnitude of the line current $I_L$, and the second shunt resistor 112 generates a second analog sense voltage which is proportional to the neutral current $I_N$. In some embodiments, the first and second shunt resistors 110 and 112 are each implemented using a Kelvin current sensor device. The Kelvin current sensor device comprises a four-terminal current sensor device comprising a shunt resistor and an integrated Kelvin connection, wherein two terminals are utilized to enable current flow through the shunt resistor, and two terminals are utilized for outputting an analog sense voltage which corresponds to a magnitude of the current flow through the shunt resistor.

For example, as shown in FIG. 1, the first shunt resistor 110 comprises (i) first and second terminals T1 and T2 (current-carrying electrodes) which allow line current $I_L$ to flow through the first shunt resistor 110 in the electrical path between the hot line 101 (first power input terminal 100A) and the output node N3, and (ii) third and fourth terminals T3 and T4 (voltage-sensing electrodes) which generate an analog sense voltage based on a magnitude of the line current $I_L$ that flows through the first shunt resistor 110. Similarly, the second shunt resistor 112 comprises (i) first and second terminals T1 and T2 which allow neutral current $I_N$ to flow through the second shunt resistor 112 in the electrical path between the neutral line 102 (second power input terminal 100B) and the second output node N4, and (ii) third and fourth terminals T3 and T4 which generate an analog sense voltage based on a magnitude of the neutral current $I_N$ which flows through the second shunt resistor 112. The 4-terminal Kelvin shunt resistor devices are configured to maximize measurement accuracy by separating the path of high current flow through the current sense resistor from the voltage sensing path.

As further shown in FIG. 1, the voltage-sensing terminals T3 and T4 of the first shunt resistor 110 are coupled to the input of the first ADC circuit 130, and the voltage-sensing terminals T3 and T4 of the second shunt resistor 112 are coupled to the input of the second ADC circuit 132. In this configuration, the analog sense voltage which is output from the first shunt resistor 110 is digitized by the first ADC circuit 130, and the analog sense voltage which is output from the second shunt resistor 112 is digitized by the second ADC circuit 132. The digitized sense voltage generated by the first ADC circuit 130 represents the magnitude of the line current $I_L$, and the digitized sense voltage generated by the second ADC circuit 132 represents the magnitude of the neural current $I_N$.

In some embodiments, the first and second ADC circuits 130 and 132 comprise high-resolution sigma-delta (ΣΔ) analog-to-digital converters which are configured to generate high-resolution digital waveforms representing the monitored line current $I_L$ and neutral current $I_N$. The line and neutral currents $I_L$ and $I_N$ are continuously monitored to generate corresponding digitized voltage sense waveforms, wherein the discrete values of the digitized voltage sense waveforms are continuously read and processed by the control circuitry (e.g., the digital controller 151 and/or the energy metering/monitoring circuitry 152) to detect potential faults. For example, any detected differences between the line and neutral current $I_L$ and $I_N$, e.g., as small as 4-6 mA (e.g., for a 20 A power load) are algorithmically synthesized to determine a ground fault condition.

When a ground fault is detected, the digital circuitry 150 (e.g., the digital controller 151) generates and outputs a control signal to the contact trip control element 160 which, in turn, causes the latching contacts 162 to open and disconnect the AC power from the output nodes N3 and N4, which interrupts power to (i) the load 105 connected to the receptacle 170 and/or (ii) downstream devices coupled to the first and second load terminals 100C and 100D. More specifically, in an exemplary embodiment such as shown in FIG. 1 where the GFCI device 100 comprises a GFCI outlet, the load 105 would be plugged into one of the receptacles 170 of the GFCI device 100. As noted above, additional downstream electrical devices (e.g., outlet devices) can be connected to the GFCI device 100 by connecting such downstream devices to the first and second load terminals 100C and 100D of the GFCI device 100. As schematically illustrated in FIG. 1, the first and second load terminals 100C and 100D are coupled to the respective first and second nodes N3 and N4 such that when the latching contacts 162 are opened (e.g., as a result of a detected ground fault), the first and second load terminals 100C and 100D are effectively disconnected from the hot line 101 and the neutral line 102, thereby interrupting AC power to the downstream devices.

In some embodiments, the calibration circuitry 140 is configured and utilized to perform calibration and self-test operations to ensure that the GFCI device 100 is functioning correctly. For example, in some embodiments, the calibration circuitry 140 comprises a power load resistor and a switching circuit which is configured to selectively connect the power load resistor between the line and neutral nodes N1 and N2 to calibrate and check the health of the GFCI device 100.

Figure 2:
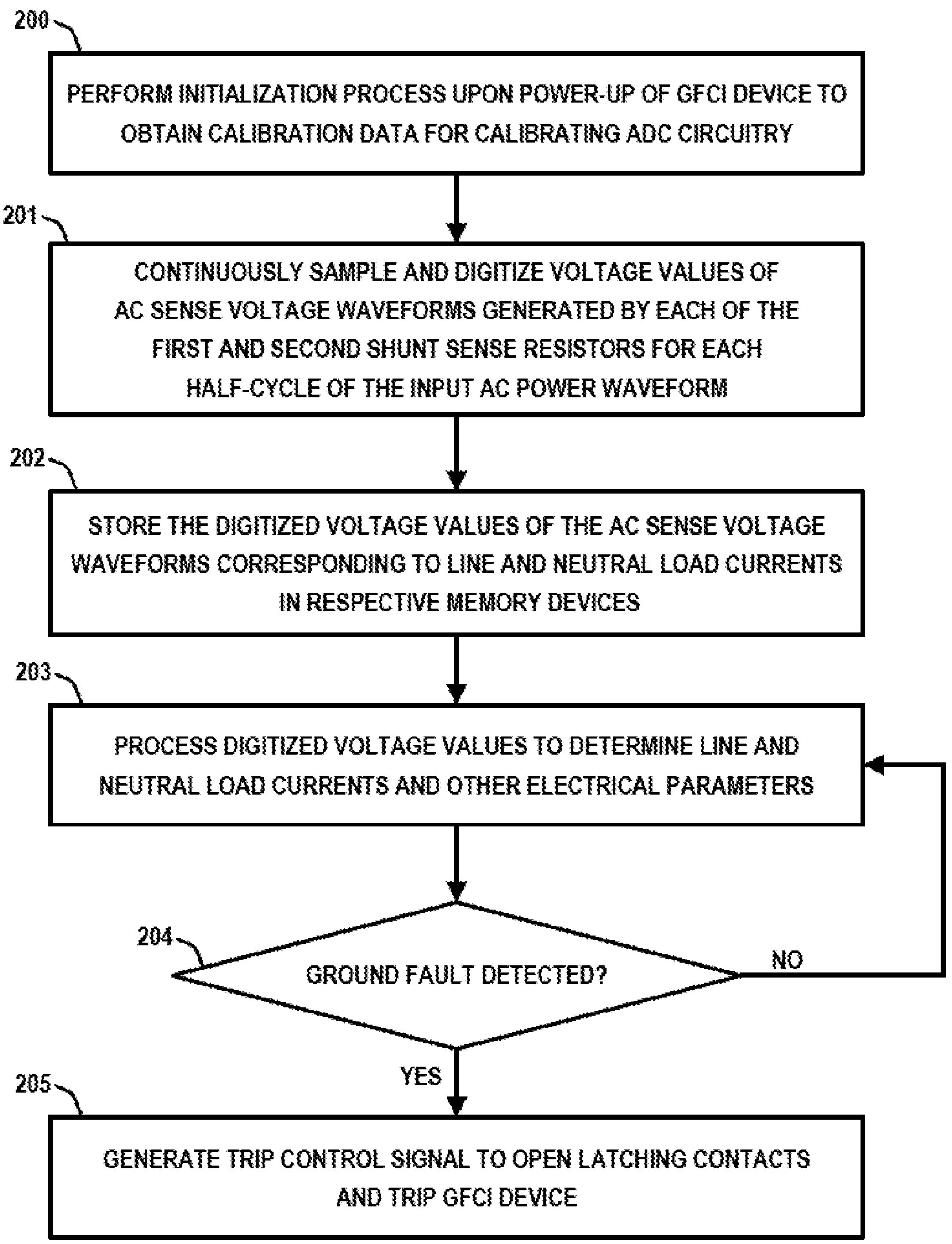
FIG. 2 illustrates a flow diagram of a method for detecting and protecting against ground fault conditions, according to an exemplary embodiment of the disclosure.

FIG. 2 illustrates a flow diagram of a method for detecting and protecting against ground fault conditions, according to an exemplary embodiment of the disclosure. In particular, FIG. 2 illustrates exemplary modes of operation of the GFCI device 100 of FIG. 1. Upon power up of the GFCI device 100, an initialization process is performed to obtain calibration data to calibrate the current sensing circuitry and functionality of the GFCI device 100 (block 200). For example, in some embodiments, an initialization/calibration process is performed as follows. The digital controller 151 generates and outputs a calibration control signal to the calibration circuitry 140, which causes the calibration circuitry 140 to switchably connect a power load resistor between the line and neutral nodes N1 and N2. The power load resistor comprises a relatively high resistance value which cases a relatively small amount of AC current (e.g., substantially zero current) to flow through the first and second shunt resistors 110 and 112. As a result, the first and second shunt resistors 110 and 112 output small AC voltages (e.g., zero-current voltages) which correspond to substantially zero current flow through the first and second shunt resistors 110 and 112. The first and second ADC circuits 130 and 132 digitize the "zero-current voltages" output from the respective first and second shunt resistors 110 and 112, and the digital circuitry 150 processes the digitized zero-current voltage to determine any differences between the first and second ADC circuits 130 and 132 and/or the first and second shunt resistors 110 and 112, and determine correction parameters that are utilized to offset such differences during normal operation of the real time operation, to thereby ensure accurate sensing functionality.

Upon completion of the initialization process, the digital controller 151 generates and outputs a calibration control signal to the calibration circuitry 140, which causes the calibration circuitry 140 to switchably disconnect the power load resistor from the line and neutral nodes N1 and N2, and the GFCI device 100 enters into a wait state until a flow of load current is detected. When load current flows to the load 105 and/or some downstream load coupled to the first and second load terminals 100C and 100D of the GFCI device 100, the resulting flow of line load current $I_L$ and neutral load current $I_N$ through the first and second shunt resistors 110 and 112 causes AC sense voltages to be generated across the third and fourth terminals T3 and T4 of the respective first and second shunt resistors 110 and 112, and the sense voltages are applied to the inputs of the first and second ADC circuits 130 and 132. The AC sense voltages correspond to the line load current $I_L$ and the neutral load current $I_N$ through the first and second shunt resistors 110 and 112 by the relation V=IR, where I denotes the line load current $I_L$ or neutral load current $I_N$, and where R denotes a resistance value of the first shunt resistor 110 or the second shunt resistor 112 (where the shunt resistance is selected to be significantly small to minimize power consumption). The first and second ADC circuits 130 and 132 are triggered in response to 0V crossings of the AC sense voltage waveforms generated and output from the first and second shunt resistors 110 and 112, respectively. Once triggered, the first and second ADC circuits 130 and 132 will continuously sample and digitize voltage values of the AC sense voltage waveforms that are generated and output from the respective first and second shunt resistors 110 and 112 for each half-cycle of the AC power waveform (block 201). In some embodiments, as noted above, the digitized voltage values that are generated and output from the first and second ADC circuits 130 and 132 are stored in respective memory devices (block 202). In other embodiments, the digitized voltage values that are generated and output from the first and second ADC circuits 130 and 132 are stored in a same memory device, but in different allocated portions of the memory device, which are allocated to the respective first and second ADC circuits 130 and 132.

The digital circuitry 150 (e.g., digital controller 151 and/or energy metering/monitoring circuitry 152) accesses the stored digital voltage values from the memory devices and processes the digitized voltage values to determine the magnitudes of the line and neutral load currents and other electrical parameters (block 203), wherein the processing result are utilized to determine if a ground fault condition is present (block 204). When a ground fault condition is detected (affirmative result in block 204), the digital controller 151 will generate and output a trip control signal to the contact trip control element 160, which then generates a signal to the trip the latching contacts 162 and disconnect the AC power from the load output nodes N3 and N4 and thus disconnect the AC power from the load 105 and/or downstream loads coupled to the first and second load terminals 100C and 100D.

In some embodiments, the memory devices 154 include a plurality of dual-port RAM devices which are utilized to store the digitized voltage values output from the first and second ADC circuits 130 and 132, and to store processing results (e.g., Peak and RMS values) that are generated by the digital circuitry 150 for each cycle of the AC power. For example, in some embodiments, the memory devices 154 comprise two (2) separate dual-ported RAM devices for storing and accessing data associated with the monitored line load current $I_L$, and two (2) separate dual-ported RAM devices for storing and accessing data associated with the monitored neutral load current $I_N$.

In particular, a first dual-ported RAM device is utilized to enable the first ADC circuit 130 to continuously store digital voltage values corresponding to the monitored line load current $I_L$ while the allowing the digital processing circuitry (e.g., digital controller 151 and/or energy metering/monitoring circuitry 152) to concurrently access the stored digital voltage values for processing. In addition, a second dual-ported RAM device is utilized to enable the second ADC circuit 132 to continuously store digital voltage values corresponding to the monitored neutral load current $I_L$ while the allowing the digital processing circuitry (e.g., digital controller 151 and/or energy metering/monitoring circuitry 152) to concurrently access the stored digital voltage values for processing.

Moreover, a third dual-ported RAM device is utilized to enable the digital processing circuitry (e.g., digital controller 151 and/or energy metering/monitoring circuitry 152) to store processing results associated with the monitored line load current $I_L$, and a fourth dual-ported RAM device is utilized to enable the digital processing circuitry (e.g., digital controller 151 and/or energy metering/monitoring circuitry 152) to store processing results associated with the monitored neutral load current $I_N$.

In some embodiments, the dual-ported RAM devices have enough storage to maintain information for multiple cycles of the AC power to determine if a fault condition exists. For example, in some embodiments, the dual-port RAM devices comprise a storage capacity of, e.g., 1.5 kilobits (24-bits×64 addresses) to store the digitized results of the first and second ADC circuits 130 and 132. During operation, the first and second dual-ported RAM devices associated with the monitored line load current $I_L$, will be utilized to store the digitized voltage values from the first ADC circuit 130 for a current AC power cycle in the first dual-ported RAM device, while the processing results (reporting) are stored in the second dual-ported RAM device based on the stored digitized voltage values from a previous cycle. Similarly, the third and fourth dual-ported RAM devices associated with the monitored neutral load current $I_N$ will be utilized to store the digitized voltage values from the second ADC circuit 132 for a current AC power cycle in the third dual-ported RAM device, while the processing results (reporting) are stored in the fourth dual-ported RAM device based on the stored digitized voltage values from a previous cycle.

In some embodiments, for each cycle of the AC power, various types of data and processing results will be generated, stored, and reported (in block 203, FIG. 2) in connection with the monitored line and neutral load currents $I_L$ and $I_N$. For example, in some embodiments, for each cycle of AC power, the following data is individually measured and reported for both the hot line (Line) and the neural line (Neutral):

(i) Instantaneous Voltage: the instantaneous voltage values of the AC sense voltage waveforms (generated by the first and second shunt resistors 110 and 112) are measured, digitized, and stored for processing and analysis;

(ii) Peak Voltage: a peak voltage on the hot line and the neutral line is determined for each AC power cycle by computing an average of a maximum voltage that is measured in each half-cycle of a given AC power cycle;

(iii) Peak Current: a peak current value (e.g., peak $I_L$ and peak $I_N$) is determined for each AC power cycle by computing an average of a maximum voltage that is measured in each half-cycle of a given AC power cycle, and dividing the average maximum voltage by the resistance value of the shunt resistor (I=V/R), e.g., the peak current value for a given AC power cycle is determined by dividing peak the determined voltage for the given AC power cycle by the resistance value of the shunt resistor;

(iv) RMS Voltage: a root mean square (RMS) voltage value is determined for each full cycle of AC power based on the measured instantaneous voltage values that are measured and stored for the full cycle of AC power, e.g., $$RMS = \sqrt[2]{\frac{(V1)^2 + (V2)^2 + (V3)^2 + \ldots , (V64)^2}{64}},$$

assuming 64 instantaneous voltage values (V1, V2, V3, . . . , V64) are measured for the each full cycle of AC power, and the RMS current value for the full cycle can be determined based on the computed RMS voltage value and the resistance value of the shunt resistor;

(v) Ground Fault: a ground fault detection is reported when a ground fault condition is deemed to occur. In some embodiments, a ground fault condition is deemed to occur when a difference (Δ) between the computed peak current and RMS current values for the Line and Neutral is more than, e.g., 4 mA over a span of a specified number n of full cycles of the AC power (e.g., n=8 cycles), wherein a fault is determined as: Fault=4 mA×R, where R is the resistance value of the current sensing shunt resistor.

In this regard, the digital circuitry 150 of the GFCI device 100 will continuously monitor the digitized current delta between the Line and Neutral wires over a power load, and determine that a ground fault condition exists when the digitized peak current values and/or RMS current values are determined to differ by an amount that meets or exceed a difference threshold $A_{Threshod}$ over the specified number n of full cycles of the AC power. In some embodiments, $A_{Threshod}$ is in a range of about 4 mA to about 6 mA.

Figure 3:
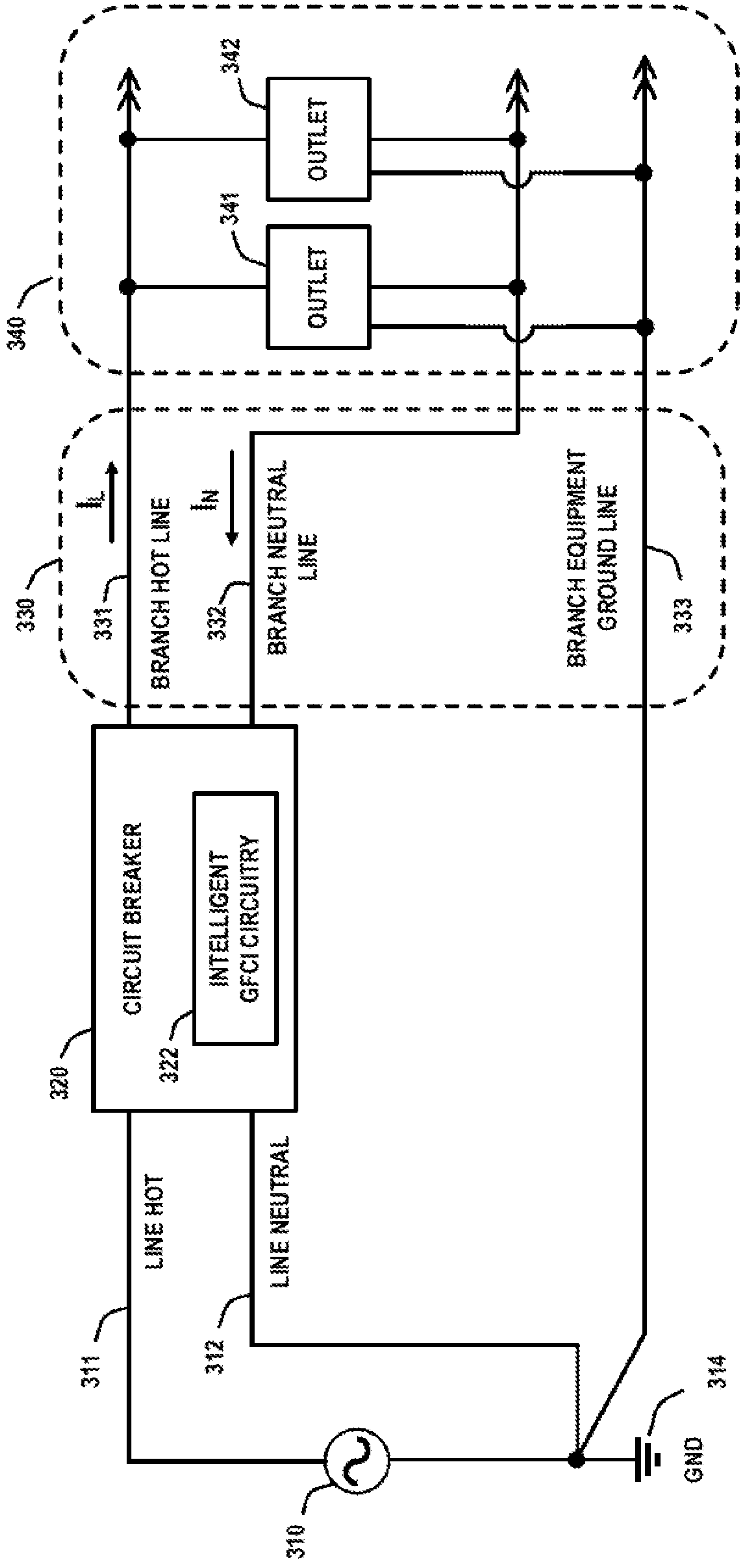
FIG. 3 schematically illustrates a system for detecting and protecting against ground fault conditions, according to an exemplary embodiment of the disclosure.

FIG. 3 schematically illustrates system 300 for detecting and protecting against ground fault conditions, according to an exemplary embodiment of the disclosure. The system 300 comprises an AC power source 310 (e.g., AC mains), a circuit breaker 320, a branch circuit feed 330, and a branch circuit 340. The circuit breaker 320 comprises intelligent GFCI circuitry 322 which, in some embodiments, is implemented using a GFCI circuit architecture similar to the GFCI architecture shown in FIG. 1, but further adapted for use in conjunction with circuit breaker functionality. The AC power source 310 is coupled to the circuit breaker 320 by a hot line 311 and neutral line 312. In an exemplary embodiment where the circuit breaker 320 is connected in a power distribution panel, the hot line 311 comprises a hot phase bus bar of the power distribution panel, and the neutral line 312 comprises a neutral "pig tail" connection to a neutral bus bar of the power distribution panel. In addition, as schematically shown in FIG. 3, the neutral line 312 is coupled to earth ground 314. In an exemplary embodiment where the circuit breaker 320 is connected in a power distribution panel, the earth ground would be connected to a ground bus bar in the power distribution panel, and the neutral bus bar would be bonded to the ground bar assuming that the power distribution panel is a primary panel directly coupled to the AC power source 310, and not a sub-panel (in which case the ground bus bar and neutral bus bar would be isolated in the sub-panel).

The branch circuit feed 330 connects the circuit breaker 320 to a branch circuit 340 comprising a plurality of electrical devices (e.g., outlets 341 and 342). The branch circuit feed 330 comprises a branch hot line 331, a branch neutral line 332, and a branch equipment ground line 333. In the exemplary embodiment of FIG. 3, the circuit breaker 320 is configured to protect the branch circuit 340 from various fault conditions including, but not limited to, short-circuit fault conditions, over-current fault conditions, arc-fault conditions, etc., as well as ground fault conditions via the intelligent GFCI circuitry 322. For example, using techniques as discussed above in conjunction with FIG. 1, the intelligent GFCI circuitry 322 can monitor and measure the line load current $I_L$ and neutral load current $I_N$ (flowing in the branch circuit feed lines (branch hot line 331 and branch neutral line 332)) using high precision current sense resistors and ADC circuits, and process digitized voltage signals corresponding to the line and neutral load currents $I_L$ and $I_N$ via digital control circuit to detect a potential ground fault. In other embodiments, the digitized voltage values can be processed to detect other fault conditions (e.g., arc-fault conditions, over-current conditions, etc.) as desired.

In some embodiments, the circuit breaker 320 comprises an intelligent solid-state circuit breaker which is implemented using exemplary circuit breaker architectures and techniques as disclosed in U.S. Pat. No. 11,373,831, which is commonly assigned and fully incorporated herein by reference. In some embodiments, the circuit breaker 320 can be configured to interrupt current flow to the branch circuit by generating a control signal in response to detection of a ground fault condition to turn off (deactivate) one or more solid-state switches (e.g., bidirectional solid-state switches) in addition to activating an electromechanical mechanism to trip a mechanical air-gap switch of the circuit breaker 320.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:

current sense circuitry configured to sense a first current flowing in a first wire and to sense a second current flowing in a second wire, the first and second wires being configured to supply alternative current (AC) power to a load coupled to the device;

analog-to-digital converter circuitry configured to generate first digital data corresponding to the first current, and to generate second digital data corresponding to the second current; and digital signal processing circuitry configured to:

process the first digital data and the second digital data to compute a measure of the first current and a measure of the second current, per cycle of the AC power, wherein the computed measure includes at least one of a peak current and a root mean square (RMS) current;

determine a difference between the computed measure of the first current and the computed measure of the second current, per cycle of the AC power; and generate a control signal to interrupt current flow in the first and second wires, in response to determining that the difference between the computed measure of the first current and the computed measure of the second current meets or exceeds a difference threshold for a given number of cycles of the AC power.

2. The device of claim 1, wherein:

the computed measure includes the peak current; and the digital signal processing circuitry is configured to:

process the first digital data to determine a first peak current in each cycle of the AC power;

process the second digital data to determine a second peak current in each cycle of the AC power;

determine the difference between the computed measure of the first current and the computed measure of the second current by determining a difference between the first peak current and the second peak current in each cycle of the AC power; and generate the control signal to interrupt the current flow in the first and second wires, at least in response to determining that the difference between the first peak current and the second peak current meets or exceeds the difference threshold over a specified number of consecutive cycles of the AC power.

3. The device of claim 1, wherein:

the computed measure includes the RMS current; and the digital signal processing circuitry is configured to:

process the first digital data to determine a first RMS current in each cycle of the AC power;

process the second digital data to determine a second RMS current in each cycle of the AC power;

determine the difference between the computed measure of the first current and the computed measure of the second current by determining a difference between the first RMS current and the second RMS current in each cycle of the AC power; and generate the control signal to interrupt the current flow in the first and second wires, at least in response to determining that the difference between the first RMS current and the second RMS current meets or exceeds the difference threshold over a specified number of consecutive cycles of the AC power.

4. The device of claim 1, wherein the current sense circuitry comprises:

a first current sense resistor configured to generate a first sense voltage which corresponds to the first current flowing in the first wire; and a second current sense resistor configured to generate a second sense voltage which corresponds to the first current flowing in the second wire.

5. The device of claim 4, wherein the first current sense resistor and the second current sense resistor each comprises a four-terminal Kelvin resistor.

6. The device of claim 4, wherein the analog-to-digital converter circuitry comprises:

a first analog-to-digital converter circuit configured to digitize the first sense voltage to generate the first digital data; and a second analog-to-digital converter circuit configured to digitize the second sense voltage to generate the second digital data.

7. The device of claim 1, wherein the device comprises a ground fault circuit interrupter outlet device.

8. The device of claim 1, wherein the device comprises a ground fault circuit interrupter circuit breaker device.

9. A device, comprising:

a first electrical path and a second electrical path configured to supply alternative current (AC) power to a load coupled to the device;

a first current sense resistor configured to generate a first sense voltage corresponding to a first current flowing in the first electrical path;

a second current sense resistor configured to generate a second sense voltage corresponding to a second current flowing in the second electrical path;

a first analog-to-digital converter circuit configured to convert the first sense voltage to a first digital voltage;

a second analog-to-digital converter circuit configured to convert the second sense voltage to a second digital voltage; and control circuitry configured to:

process the first digital voltage and the second digital voltage to compute a measure of the first current and a measure of the second current, per cycle of the AC power, wherein the computed measure includes at least one of a peak current and a root mean square (RMS) current;

determine a difference between the computed measure of the first current and the computed measure of the second current, per cycle of the AC power; and generate a control signal to interrupt current flow in the first and second electrical paths, in response to determining that the difference between the computed measure of the first current and the computed measure of the second current meets or exceeds a difference threshold for a given number of cycles of the AC power.

10. The device of claim 9, wherein the first current sense resistor and the second current sense resistor each comprise a four-terminal Kelvin resistor device.

11. The device of claim 9, wherein;

the computed measure includes the peak current; and the control circuitry is configured to:

process the first digital voltage to determine a first peak voltage in each cycle of the AC power, and determine a first peak current which corresponds to the first peak voltage based on a resistance of the first current sense resistor;

process the second digital voltage to determine a second peak voltage in each cycle of the AC power, and determine a second peak current which corresponds to the second peak voltage based on a resistance of the second current sense resistor;

determine the difference between the computed measure of the first current and the computed measure of the second current by determining a difference between the first peak current and the second peak current in each cycle of the AC power; and generate the control signal to interrupt the current flow in the first and second electrical paths through the device, at least in response to determining that the difference between the first peak current and the second peak current meets or exceeds the difference threshold over a specified number of consecutive cycles of the AC power.

12. The device of claim 9, wherein:

the computed measure includes the RMS current; and the control circuitry is configured to:

process the first digital voltage to determine a first root mean square (RMS) voltage in each cycle of the AC power, and determine a first RMS current which corresponds to the first RMS voltage based on a resistance of the first current sense resistor;

process the second digital voltage to determine a second RMS voltage in each cycle of the AC power, and determine a second RMS current which corresponds to the second RMS voltage based on a resistance of the second current sense resistor;

determine the difference between the computed measure of the first current and the computed measure of the second current by determining a difference between the first RMS current and the second RMS current in each cycle of the AC power; and generate the control signal to interrupt the current flow in the first and second electrical paths through the device, at least in response to determining that the difference between the first RMS current and the second RMS current meets or exceeds the difference threshold over a specified number of consecutive cycles of the AC power.

13. The device of claim 9, further comprising:

a first dual-ported memory device configured enable the first analog-to-digital converter circuit to store digital values of the first digital voltage in a current cycle of the AC power, while the control circuitry reads digital values of the first digital voltage stored in a previous cycle of the AC power; and a second dual-ported memory device configured enable the second analog-to-digital converter circuit to store digital values of the second digital voltage in the current cycle of the AC power, while the control circuitry reads digital values of the second digital voltage stored in the previous cycle of the AC power.

14. The device of claim 9, wherein the first analog-to-digital converter circuit and the second analog-to-digital converter circuit each comprise a delta-sigma analog-to-digital converter.

15. The device of claim 9, wherein the device comprises a ground fault circuit interrupter outlet device.

16. The device of claim 9, wherein the device comprises a ground fault circuit interrupter circuit breaker device.

17. The device of claim 9, wherein the device comprises at least one of an electromechanical switch and a solid-state switch that is responsive to the control signal to interrupt the current flow in the first and second electrical paths through the device.

18. A method, comprising:

sensing a first current flowing in a first wire and a second current flowing in a second wire, the first and second wires being configured to supply alternative current (AC) power to a load;

generating first digital data corresponding to the first current, and second digital data corresponding to the second current;

processing the first digital data and the second digital data to compute a measure of the first current and a measure of the second current, per cycle of the AC power, wherein the computed measure includes at least one of a peak current and a root mean square (RMS) current;

determining a difference between the computed measure of the first current and the computed measure of the second current; and generating a control signal to interrupt current flow in the first and second wires, in response to determining that the difference between the computed measure of the first current and the computed measure of the second current meets or exceeds a difference threshold.

19. The method of claim 18, wherein;

the computed measure includes the peak current; and processing the first digital data and the second digital data comprises:

processing the first digital data to determine a first peak current in each cycle of the AC power;

processing the second digital data to determine a second peak current in each cycle of the AC power;

determining the difference between the computed measure of the first current and the computed measure of the second current by determining a difference between the first peak current and the second peak current in each cycle of the AC power; and generating the control signal to interrupt the current flow in the first and second wires, at least in response to determining that the difference between the first peak current and the second peak current meets or exceeds the difference threshold over a specified number of consecutive cycles of the AC power.

20. The method of claim 18, wherein:

the computed measure includes the RMS current; and processing the first digital data and the second digital data comprises:

processing the first digital data to determine a first root mean square (RMS) current in each cycle of the AC power;

processing the second digital data to determine a second RMS current in each cycle of the AC power;

determining the difference between the computed measure of the first current and the computed measure of the second current by determining a difference between the first RMS current and the second RMS current in each cycle of the AC power; and generating the control signal to interrupt the current flow in the first and second wires, at least in response to determining that the difference between the first RMS current and the second RMS current meets or exceeds the difference threshold over a specified number of consecutive cycles of the AC power.

* * * * *